Jan. 9, 1968        R. FORD ETAL        3,362,601
MACHINE TOOL CONTROL APPARATUS
Filed Nov. 2, 1966        2 Sheets-Sheet 1
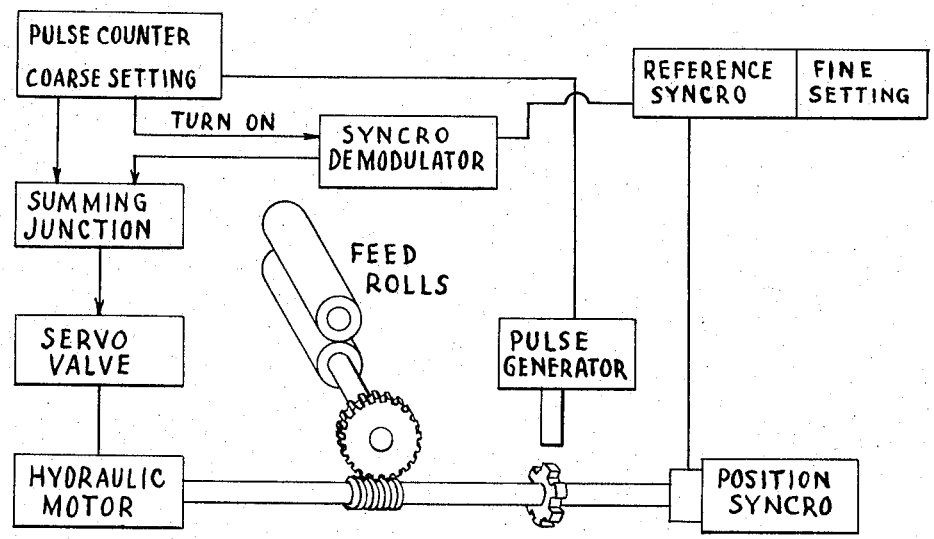
FIG-1-
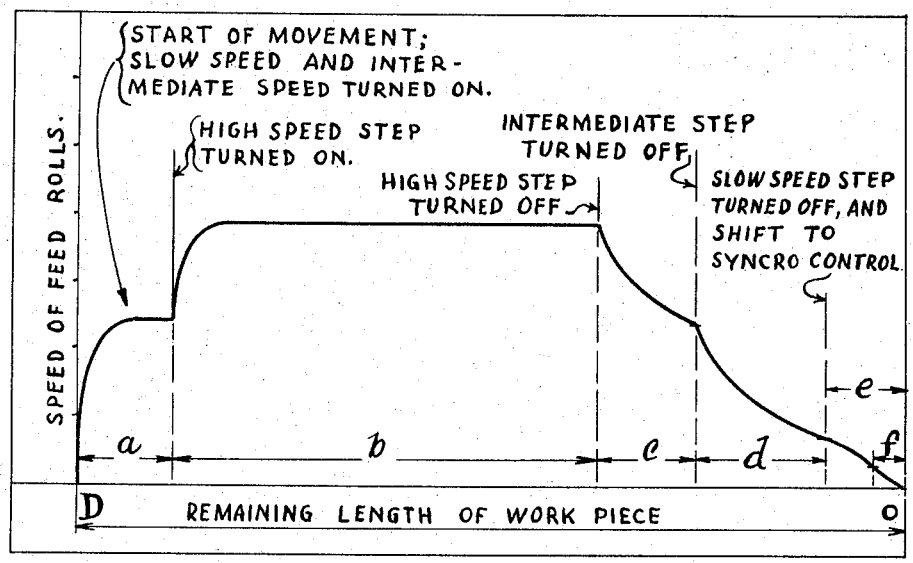
FIG-2-
INVENTORS:
RALPH FORD,
JOHN M. McCORMICK.
Owen + Owen
ATT'YS.

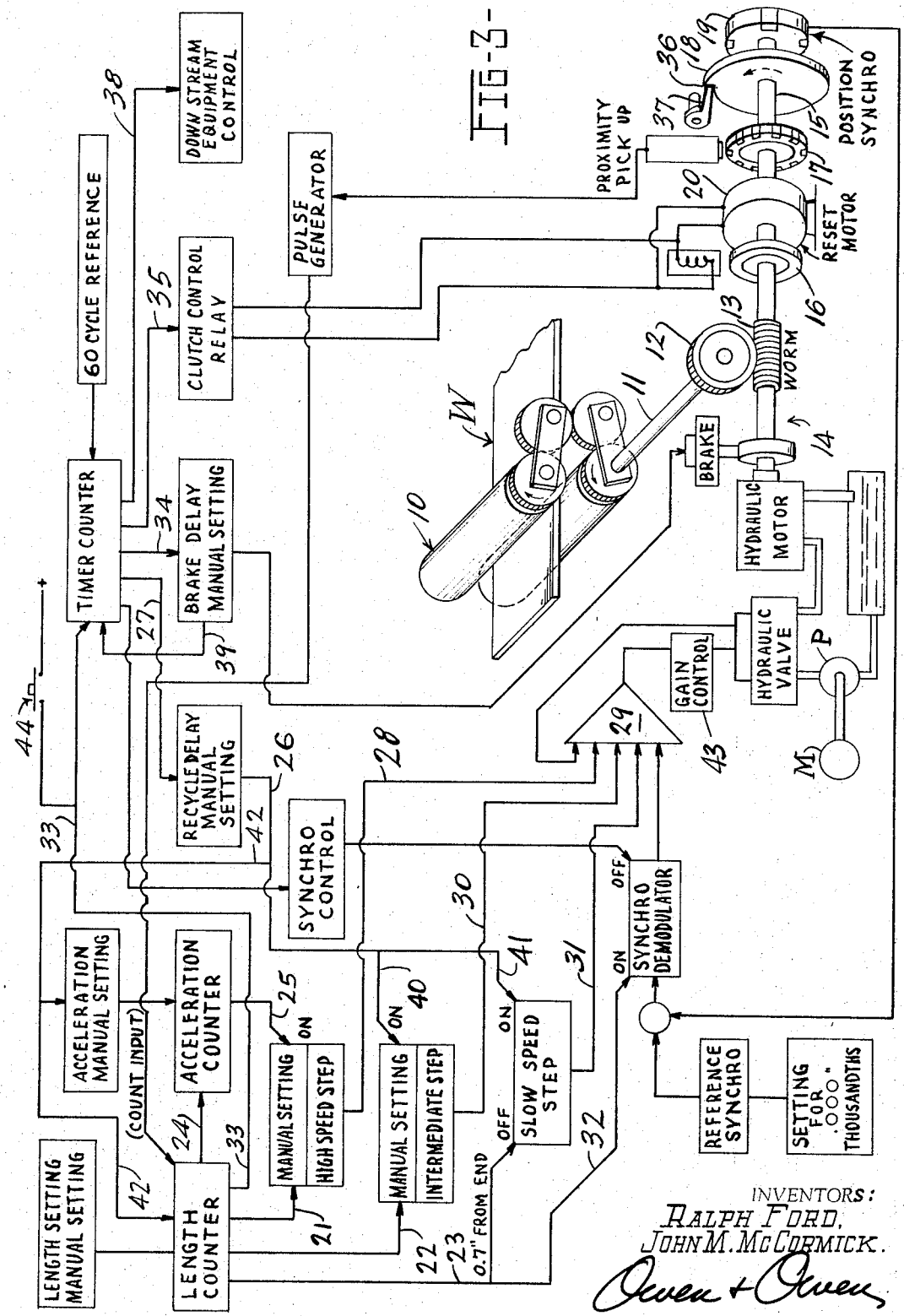

United States Patent Office 3,362,601
Patented Jan. 9, 1968

3,362,601
MACHINE TOOL CONTROL APPARATUS
Ralph Ford, Grand Rapids, and John M. McCormick,
Toledo, Ohio, assignors to The Ford Machinery Co.,
Toledo, Ohio, a corporation of Ohio
Filed Nov. 2, 1966, Ser. No. 591,590
10 Claims. (Cl. 226—122)

This invention relates to an electro-mechanical system for controlling the operation of a machine used to position and/or perform a machining operation upon a series of workpieces. More specifically, this invention relates to an electro-mechanical system for controlling the movement of a series of workpieces which are sequentially moved through a machine tool, which system is capable of rapidly and accurately positioning said pieces in sequence to a predetermined position, with accuracy up to 0.001 inch.

The electro-mechanical control system of this invention is described with reference to a machine tool including hydraulically driven feed rollers for feeding sheet steel a predetermined distance in rapid sequence. It will be obvious to those skilled in the art that such a system can be used in any number of machine tool applications, such as sequentially positioning a rotary worktable or moving other types of stock or workpieces.

The system of this invention contemplates the use of electronic pulse counters which receive and count electronic pulses from the drive system for the feed rolls or driven sensing rollers which are moved in proportion to the distance which the workpiece or stock has traveled. Such electronic pulse counters, which may be preset to generate an output signal after receipt of a predetermined number of pulses, are used to calculate the length which has been fed through the machine tool and to generate output pulses to control further movement of the workpiece. In addition to the use of the electronic pulse counters, an electrical synchro system is used to control the movement of the workpiece after it has passed through a predetermined portion of its movement. The system is so arranged that the movement of the workpiece is initially controlled solely by the output from the pulse counters and, after a predetermined portion of the workpiece has been moved, movement control is shifted from the pulse counters to the synchro control for final movement and accurate positioning of the workpiece.

U.S. Patent 2,866,428 discloses a machine tool control system in which the length of sheet metal fed is controlled solely by electronic counters which receive a number of pulses proportional to the turns of the sheet metal feed rollers or the distance which the piece has traveled. Because the relationship between the number of pulses received and the length of travel of the workpiece is necessarily fixed by a gear ratio, in such a system it is necessary to have a gear ratio so that one revolution of the feed rollers generates a substantially large number of pulses in order that accuracy within, for instance, 0.01 inch can be maintained. Also, in such a system, the feed rollers and thus the sheet metal are moved at a constant speed and, because the rapid movement continues until the end of the stroke, a substantial break or clamping force is required to stop the metal and feed rolls from going past their intended position.

The system of this invention is considered to be an improvement over that disclosed in said U.S. Patent 2,866,428 in that the system of this invention may be programmed to rapidly translate the workpiece at various velocities, starting slowly, thence accelerating, thence decelerating and finally, at a predetermined distance from the end position, to transfer control of movement from the pulse counter system to the synchro system which will slowly move the piece to the exact desired position.

Accordingly, it is an object of this invention to provide an electro-mechanical control system for controlling the movement of a workpiece through a machine tool, which system is capable of rapidly and accurately positioning a series of workpieces in sequence in order that a machining operation may be performed thereon.

It is another object of this invention to provide an electro-mechanical system for sequentially positioning a series of workpieces within a machine tool in which each of the pieces is rapidly moved during its initial movement and then is slowed down and accurately positioned to its final position within the machine tool.

It is still another object of this invention to provide an electro-mechanical system for controlling the movement of workpieces through a machine tool which includes a first control means including an electronic pulse counter and a pulse transformer which receives pulses in fixed proportion to the position of a workpiece moving therethrough and a second control means including a reference and position synchro which will further control the position of the workpiece as it moves through the machine, and means for deactivating the first control means and transferring control to the second control means when the workpiece is a predetermined distance from its final position.

Other objects and advantages of the invention will be apparent to persons skilled in the art, reference being made to the accompanying drawings in which:

FIG. 1 is a schematic view of a greatly simplified control system according to this invention, showing (1) a first movement control means including the pulse counter and a pulse transformer responsive to movement of a pair of feed rolls connected to control a servo valve which in turn controls a hydraulic motor driving the feed rolls and (2) a second movement control means including a position and reference synchro which control the movement of the hydraulic motor after control has been transferred from the first movement control means;

FIG. 2 is a graphic showing of the movement of a typical workpiece from its start to finish, showing the speed of the workpiece as the various cycles from the pulse counter and synchro system are applied to the servo valve of the hydraulic motor, and;

FIG. 3 is a schematic diagram showing the complete system of this invention used to drive feed rolls for feeding sheets of steel, and illustrating in some detail the electro-mechanical system which is used to reposition the synchro after the completion of one cycle so that it will be ready when a second cycle is initiated.

Summary of the invention

In the system schematically shown in FIGS. 1 and 3, movement of the feed rolls for imparting movement to sheets of strip steel is controlled by a hydraulic motor connected to the feed roll through an appropriate gear train. The hydraulic motor is in turn connected by an electro-hydraulic servo valve whose output is proportional to the magnitude of the input voltage from the electrical control system. Such electro-hydraulic servo valves are commercially available from several sources and include servo amplifiers which are voltage sensitive devices responsive to input currents in the microampere region. Such valves operate generally by comparing a position or command signal from an electrical control system with a position error signal. The position or command signal initially is generated by the electrical control system and is so programmed that its magnitude is proportional to a predetermined velocity schedule. Subsequent to this schedule, the command signal is generated by a synchro system such that its magnitude is proportional to the position of the workpiece relative to its desired end position. The valves further include a feedback signal proportional to the valve position (and thus proportional to workpiece velocity) to modify the command signal to modify the characteristic of the slowdown portion of the movement of the workpiece.

Mechanically attached to the drive mechanism for the feed rolls is a pulse generator system which includes a toothed gear driven at a speed in fixed proportion to the speed of the feed rolls and an electrical pulse generator which generates a voltage pulse each time the forward and reverse slopes of the teeth of the toothed gear pass its magnetic pick up. Such pulse generators are well known to those skilled in the art and rely on variations in the inductance of a coil caused by varying the proximity between the teeth of the toothed wheel and the magnetic pick up. It will be apparent that the number of pulses generated by the pulse transformer in a given time is proportional to the number of revolutions of the feed rolls during that time and thus the distance which a workpiece has been moved by the feed rolls can be electrically indicated by the number of pulses received from the pulse generator system.

Electrically connected to the pulse generator is an electronic pulse counter whose output is electrically connected to a voltage summing junction which in turn is electrically connected to the electro-hydraulic servo valve which controls the hydraulic drive motor. The electronic counter employed is a device which may be manually preset to generate a number of output signals in sequence after a predetermined number of input pulses from the pulse generator have been received. Such devices are well known in the art, and generally speaking, comprise a matrix of bistable circuits designed to trip or generate an output pulse upon the receipt of a predetermined number of input pulses. Commercially available units include manually operable settings or thumb wheels so that one or a series of output signals can be preset for actuation after receipt of any number of input pulses.

Referring to the simplified system shown in FIG. 1, the pulse counter may be preset to generate an electrical output to the voltage summing junction until a predetermined number of pulses have been received from the pulse generator. Because the number of pulses from the pulse generator is proportional to the movement of the feed rolls and thus the distance which a workpiece has been moved, the pulse counter can be set to move the workpiece a given distance and then cease its signal to the summing junction. In the simplified system shown in FIG. 1, a second output from the pulse counter is electrically connected to a synchro demodulator which is turned on at the same time that the output from the pulse counter to the summing junction ceases.

The synchro control system includes a position synchro driven by the hydraulic motor and a manually adjusted reference synchro. As is well known to those skilled in the art, the electrical output of the synchro system depends on the difference in position between the reference and position synchros. Thus if the reference synchro is manually set to indicate the desired terminal position of the workpiece, the position synchro will not reach that corresponding setting until it is turned by the hydraulic motor as the feed rolls are turning to move the workpiece to that desired position. Until zero position is reached, there will be an electrical output from the synchro demodulator to the summing junction, which electrical output will operate the electro-mechanical servo valve controlling the hydraulic motor. The output of the synchro system is not used until the position error of the synchro is less than one-half of a revolution of the driven synchro, as will be seen from the description below.

Summarizing the operation of the simplified system of FIG. 1, initial movement of the feed rolls and the workpiece is caused by an electrical signal from the pulse counter through the summing junction to the servo valve until a predetermined length of the workpiece has been moved, as determined by the number of pulses from the pulse generator to the pulse counter. At this position, the electrical output from the pulse counter to the summing junction is turned off and the synchro demodulator is actuated so that the remaining movement of the workpiece is controlled by the synchro system.

Use of a synchro system for controlling final movement of the workpiece is an important part of the system of this invention because, as previously explained, control by the pulse counter cannot be used for positioning the workpiece within the accuracy of the synchro control system. Furthermore, for a system in which the length of the workpiece to be positioned is relatively large, it is desirable to quickly move the majority of this relatively large length and to slow down toward the end of the movement for accurate positioning by the synchro control. Because of the number of preset output signals which may be programmed within the pulse counter, it is possible to effectively use the sum of several output signals on the summing junction so that initial movement may be slowly started, then accelerated, then decelerated and finally stopped prior to transferring control to the synchro system. This enables rapid prepositioning of the workpieces prior to turning over fine adjustment to the synchro control system.

It is necessary to return the position synchro to its initial position at the end of the movement of a single workpiece before starting a second cycle. This is accomplished by use of a mechanical reset system which is actuated by an electrical pulse from the pulse counter, as will be discussed in detail below. Also, a brake for the mechanical drive of the feed rolls may be similarly activated and de-activated by electrical signals in accordance with a predetermined program and various output signals for control of machine tool equipment, such as a shear and punch, may also be incorporated in the system.

*Detailed description of a preferred embodiment of the invention*

Referring to FIG. 3, a workpiece W is driven by two interconnected feed rolls, generally designated by reference numeral 10, which are interconnected by terminal drive gears to a drive shaft 11. A pinion 12 is secured to the drive shaft 11 and is engaged with a worm gear 13 secured to the output shaft 14 of a hydraulic motor. The hydraulic motor is supplied with hydraulic fluid at constant pressure from a pump P driven by an electric motor M. The flow of fluid to the hydraulic motor is controlled by the electrically controlled hydraulic valve whose output is proportional to the magnitude of the electrical input signal, as previously explained. Connected to the output shaft 14 of the hydraulic motor is an axial accessory shaft 15 which is driven by the motor shaft 14 through an electrically controlled clutch 16. Secured to the accessory shaft 15 is the toothed wheel 17, a reset cam 18, the position synchro 19 and a reset motor 20 whose function will be subsequently explained.

As previously explained, the amount of rotation of the toothed wheel 17 is in fixed proportion to the amount of rotation of the feed rolls 10, and thus, assuming no slippage between the workpiece W and the feed rolls 10, the amount of rotation of the toothed wheel 17 is proportional to the distance of movement of the workpiece W. Assume for instance that, in this preferred embodiment, one revolution of the toothed wheel 17 takes place for each two inches of linear movement of the workpiece W. If the toothed wheel has ten teeth on its outer circumference, then an electrical pulse will be generated by the pulse generator twenty times for each revolution of the toothed wheel 17, because the magnetic proximity pickup detects both the forward and reverse slopes of each tooth. Therefore each pulse from the pulse generator will indicate that the workpiece W has moved $\frac{1}{10}$ or 0.10 inch.

Signals from the pulse generator, after being electrically modulated by a pulse shaper, a differentiator, and a rectifier (not shown) are transmitted to the "Length Counter" portion of the pulse counter through a signal path labeled "Count Input."

As previously explained, the pulse counter may be manually preset to generate a number of outputs, each one occurring after receipt of its particular predetermined number of pulses. Shown in FIG. 3 are three blocks corresponding to three separate output signal matrixes which are to generate output signals. Each of these three circuits receives an input signal from the Length Counter through signal paths 21, 22, and 23, respectively. An "Acceleration Counter" circuit is electrically connected to the Length Counter through a signal path 24 and has its output connected to the High Speed Step through a signal path 25. The Intermediate and Slow Speed Steps are both electrically connected to a Recycle Delay Circuit by a signal path 26 which is in turn connected by a signal path 27 to an electrical frequency Timer Counter, the purpose of which will be subsequently explained.

As previously explained, each of the several output circuits of the pulse counter may be manually preset to generate an output pulse after receipt of a predetermined number of input pulses from the pulse generator. These adjustments which include the "Length Setting" for the Length Counter, an "Accelerating Setting" for the Acceleration Counter and the High Speed and Intermediate Speed Settings, are programmed, by pulse count, in terms of distance [1] through which the workpiece W has yet to move before reaching its final position. Referring to FIG. 2, if the total length which the workpiece W is to move is D inches, the various output circuits of the pulse counter may be actuated to generate a signal after receipt of any number of pulses less than D times 10. Assume that for a workpiece of length D, it is desired to (1) initiate movement of the workpiece at an intermediate speed and, after movement has been initiated the piece has moved a fixed distance $a$, (2) to accelerate movement until the piece has moved a further distance $b$, (3) then to decelerate to the first speed until the workpiece has moved a further distance $c$, and (4) again decelerate to a slow speed until the workpiece has moved a distance $d$. Following this example, the Length Counter is manually preset for a number of pulses corresponding to the total length of the workpiece D, minus a small increment at the end thereof, designated as $e$ in FIG. 2. This increment $e$, as will be subsequently explained, is the distance through which the movement of the workpiece is controlled by the synchro system. In this preferred embodiment, assuming that the increment $e$ is fixed at 0.7 inch from the end position of the workpiece, then the total pulse setting in the Length Counter is $(D \times 10) - 7$.

The manual setting for the Acceleration Counter is preset to generate an output through signal path 25 to the High Speed Step after receiving a predetermined number of pulses from the Length Counter through the signal path 24 which corresponds to the distance $a$ shown in FIG. 2. This output signal from the Acceleration Counter turns on the High Speed Step. The manual setting for the High Speed Step, is preset to generate an output through the signal path 28 to the electrical summing junction 29 until it has received a predetermined number of pulses after being turned on from the Length Counter through the signal path 21 corresponding to the distance $b$ in FIG. 2. The manual setting for the Intermediate Step is preset to generate an output to the summing junction 29 through a signal path 30 after being turned on by the Recycle Delay Setting until it has received a predetermined number of pulses from the Length Counter through the signal path 22 equal to the sum of distances $a$, $b$, and $c$ in FIG. 2. Finally, the Length Counter is preset to generate a turn-off signal to the Slow Speed Step through the signal path 23 after it has received pulses indicating that the workpiece is within distance $e$ from the end or zero position. These relationships are graphically seen in FIG. 2 where it is indicated that at the start of the movement of the workpiece, both the Intermediate and Slow Speed Steps are turned on by a signal from the signal path 26 through the Recycle Delay Setting and initiated from the electrical frequency Timer Counter. This signal starts the workpiece moving at a velocity in proportion to the sum of the electrical voltages received by the summing junction 29 from the Intermediate and Slow Speed Steps. As the piece moves, the toothed wheel 17 is turned in fixed proportion thereto and pulses are generated by the pulse generator and picked up and stored by the Length Counter. At the end of movement distance $a$ the Acceleration Counter, through signal path 24, has received its predetermined number of pulses and consequently an output through signal path 25 is generated to turn on the High Speed Step which adds its voltage through signal path 28 to the summing junction, thus increasing the speed of the workpiece W for a length of work corresponding to length $b$. At this time, the High Speed Step has received its predetermined number of pulses from the Length Counter through the signal path 21 and is turned off, thus returning the circuits to the condition where the Intermediate and Slow Speed Steps are supplying their output voltages through the signal paths 30 and 31, respectively, to the summing junction 29. At the end of increment $c$, the Intermediate Step has received its predetermined number of pulses through the signal path 22 from the Length Counter and it is turned off so that the only signal received by the summing junction 29 is from the Slow Speed Step through the signal path 31. At the end of increment $d$, an output from the Length Counter through the signal path 23 is generated to turn off the Slow Speed Step. At this time, the same electrical signal through the signal path 23 turns on a synchro demodulator through a branch signal path 32.

As previously explained, movement during the increment $e$, as shown in FIG. 2, is controlled exclusively by the difference signal between the position synchro 19 and the reference synchro, the magnitude of which is proportional to the differential position of the position synchro 19 to the reference synchro which has been preset to indicate the end or terminal position of the workpiece W. As seen in FIG. 2, the speed of the feed rolls is gradually slowed until the terminal or reference position is reached. Thus when the position synchro 19 and the reference synchro are in electrical alignment, the sum of the input voltages to the summing junction 29 is zero and consequently there is no command voltage to the servo hydraulic valve. At this state, the feed rollers 10 and the workpiece W are at rest.

It will be apparent that it is necessary to return the position synchro 19 to its initial position at the end of a cycle prior to initiating the start of another cycle after control is returned to the Length Counter system. The clutch 16, reset motor 20, the reset cam 18 and their appropriate controls are used for this purpose. When the workpiece W is under synchro control during the last increment of movement, designated by $e$ in FIG. 2, the Length Counter is preset to generate an output signal, at a small distance (less than $e$), from the end position of the workpiece. This small distance, designated in FIG. 2 as $f$, is, in practice, about 1/10 of an inch. This signal is received by a frequency responsive Timer Counter through a signal path 33. The Timer Counter is actuated by 60 cycle AC current and may be programmed to emit a number of output signals after a predetermined number of cycles of input current have passed.

The first programmed output cycle from the Timer Counter, after receipt of the turn-on signal through the signal path 33, is applied to a brake control mechanism through a signal path 34. Upon receipt of this signal, the brake control mechanism, which may be electrical pneumatic or hydraulic, applies a mechanical brake to the

---

[1] In this embodiment, 20 pulses equal two inches of travel of the workpiece W.

output shaft 14 to hold it, the worm gear 13, the feed rolls 10 and workpiece W in fixed position. The brake control mechanism may be manually preset to delay application of the brake to assure that the workpiece W has reached its zero position and that movement of the feed rolls 10 and their associated drive equipment including the output shaft 14 has stopped. In practice, this delay is a fraction of a second because the workpiece was only 1/10 of an inch (the distance $f$ in FIG. 2) from its zero position when the Timer Counter was turned on by the Length Counter through the signal path 33. A reset signal from the Brake Delay Control is applied to the Timer Counter through a signal path 39 to reset the timer for subsequent generation of additional output signals.

A short time after the brake has been applied and the Timer Counter has been reset, the next programmed output signal emitted by the Timer Counter is applied through a signal path 35 to a Clutch Control Relay which releases or disengages the electric clutch 16 which couples the output shaft 14 and the accessory shaft 15. With the clutch 16 disengaged, the accessory shaft 15 is free to rotate relative to the output shaft 14. At the same time, the reset motor 20 is energized by the signal from the Clutch Control Relay and turns the accessory shaft 15 in the direction shown by the broken arrow on the reset cam 18. The accessory shaft 15, which turns the position synchro 19, is turned in this direction until the cam lobe 36 strikes its detent 37 to stop movement of the cam 18 and accessory shaft 15. The length of the signal to the reset motor 20 is short because no more than one revolution of the cam 18 is necessary to return the accessory shaft 15 and thus the position synchro 19 to their initial position. As soon as this short signal from the Clutch Control Relay has ceased, the reset motor 20 is de-energized and the clutch 16 is re-engaged so that the accessory shaft 15 is again coupled to the output shaft 14 and the position synchro 19 will turn with the output shaft 14.

The next programmed signal to be emitted from the Timer Counter, after the synchro 19 has been repositioned and the clutch 16 re-engaged, is an output signal through a signal path 38 which is used to energize or start other equipment, such as a shear press or punch which is to perform a machining operation on the workpiece W. After a predetermined time, depending upon the machining operation to be performed, the next programmed signal emitted from the Timer Counter will be a brake release signal, and a simultaneous signal through a signal path 27 to the Recycle Delay Control.

The Recycle Delay Control is manually present to generate an output signal a predetermined time after receipt of the signal through a signal path 27 from the Timer Counter. This signal from the Recycle Delay Control turns on the Intermediate and Slow Speed Steps through signal paths 26 and 40, 41, respectively. At the same time, this output signal from the Recycle Delay Control is applied to the Length Counter through a signal path 42 to start the new cycle for the Length Counter. Thus it will be seen that the delayed signal from the Recycle Delay Control turns on both the Intermediate and Slow Speed Steps so that their output is fed, through signal paths 30 and 31, to the summing junction 29, as previously described, and the Length Counter begins its count and controls the movement of the feed rolls 10 and subsequent workpiece W as previously described.

Finally, a manually operable pushbutton switch 44 is connected between a power source and the signal path 33 leading to the Timer Counter so that the cycle of operation may be manually initiated by closing the normally open contacts of the switch 44. Once the cycle has begun, the subsequent cycles are re-initiated by the Recycle Delay Control as previously explained.

It will be apparent to those skilled in the art that the distance through which a series of workpieces move during a particular velocity setting can be advantageously varied, depending upon the size, weight and length of the workpieces and the desired rapidity of the cycle. The distance $e$, which is the length from the end of the workpiece at which control is transferred to the synchrosystem, has been selected, in this preferred embodiment, as 0.7 inch and the distance $f$, which is the distance from the end of the workpiece W at which the cycle of the Timer Counter is initiated, has been selected to be 0.1 inch, so that final movement by the synchro control system of the workpiece W can be completed prior to application of the brake to the output shaft 14. Application of the brake, as previously explained, occurs a predetermined time after receipt of the turn-on signal from the Timer Counter and is independent of the position of the workpiece within the limits of distance $f$. It will be apparent, however, that these distances $e$ and $f$, may be varied, depending upon the nature of the workpiece to be cycled or the portion of a machine tool to be positioned.

It will further be apparent that a primary advantage of the invention previously described is the fact that mechanical changes are unnecessary in order to vary the acceleration or velocity cycle of movement of the workpiece under the control of the pulse counter. Thus the distances $a$–$d$, may be varied by making a simple adjustment to the manual settings of the Length Counter. Thus the system provides a readily programmed control means for movement of any number of types of workpieces. In addition, the absolute velocity of the feed rolls 10 and thus of the workpiece W may be varied by adjustment of a gain control 43, between the summing junction 29 and the electro-hydraulic servo valve controlling the flow of fluid to the hydraulic motor. In practice, the gain control 43 is set at the highest speed at which satisfactory position response can be maintained.

While the embodiment previously described is programmed to sequentially advance a series of workpieces a single predetermined distance, it will be apparent to those skilled in the art that it may be readily modified to control the positioning of a sequence of workpieces of variable predetermined lengths by presetting such information into the various electronic counters. In either event, the operation of the control system of this invention has the aforesaid advantages over those known in the prior art.

It will further be apparent that various changes and modifications can be made to the specific details of the preferred embodiment of this invention described above, without departing from the scope and spirit of the attached claims.

We claim:

1. An apparatus for positioning a driven member relative to fixed members in a machine tool, comprising, in combination, drive means including a hydraulic motor for moving said driven member and a servo-electric valve for controlling fluid flow to said hydraulic motor, means responsive to movement of said driven member for generating an electrical impulse for each increment of movement of a predetermined size of said driven member, an electrical counter operatively connected to said impulse generating means whereby the total pulses from all increments of movement of said driven member are received by said electrical counter, means for programming said counter to generate an output signal until receipt of a predeterined number of impulses from said impulse generating means, control means operatively connected to said servo-electric valve controlling said hydraulic motor and to said electrical counter causing said servo-electric valve to cause fluid flow to said hydraulic motor to move said driven member at a speed proportional to the magnitude of said output signal from said counter and causing said servo-electric valve to cause fluid flow to said hydraulic motor to stop movement of said driven member upon termination of said output signal, and means to return said electrical counter to its initial condition and to initiate subsequent movement of said driven member by said hydraulic motor.

2. The apparatus of claim 1 wherein said control means includes an electrical summing junction operatively connected to said servo-electric valve and to said electrical counter whereby said servo-electric valve will permit fluid flow to said hydraulic motor in proportion to the magnitude of the electrical signal from said counter.

3. The apparatus of claim 1 wherein said electrical counter includes means for generating a plurality of output signals, each after receipt of a predetermined number of impulses from said impulse generating means, and wherein said control means is responsive to said plurality of output signals to drive said hydraulic motor at speeds proportional to the magnitude of said output signals.

4. The apparatus of claim 3 wherein said electrical counter includes means for programming said plurality of output signals such that each will occur after receipt of a predetermined different number of impulses from said impulse generating means.

5. An apparatus for positioning a driven member relative to fixed members in a machine tool, comprising, in combination;
  (a) a first control means including
    (1) a pulse generating means operatively connected to said driven member for generating an electrical impulse for each increment of movement of a predetermined size of said driven member,
    (2) an electrical counter operatively connected to said pulse generating means whereby the total pulses from all increments of movement of said driven member are received by said electrical counter, and
    (3) means for programming said counter to generate at least one output signal after receipt of a predetermined number of impulses from said impulse generating means,
  (b) a second control means including a synchro control system driven by said driven member and having an output responsive to the difference in position between a predetermined end position for said driven member and the instantaneous actual position of said driven member,
  (c) an electro-hydraulic drive means for moving said driven member in response to electrical signals from said first and said second control means,
  (d) means connecting said first and second control means with said electro-hydraulic drive means whereby said driven member is moved by said first control means until receipt of said output signal from said counter after said predetermined number of impulses from said impulse generating means,
  (e) means for shifting control of said electro-hydraulic drive means from said first to said second control means upon receipt of said output signal whereby continued movement of said driven member is caused by said second control means until said driven member has reached said predetermined end position, and
  (f) means effective to return said first and second control means to their initial condition and to initiate further movement of said driven member.

6. The apparatus of claim 5 wherein said electrical counter includes means for generating a plurality of output signals, each after receipt of a different predetermined number of impulses from said pulse generating means and in which said electro-hydraulic drive means is responsive to said plurality of output signals to move said driven member at speeds proportional to the sum of said output signals.

7. The apparatus of claim 6 wherein said electrical counter includes means for programming each of said plurality output signals to start and stop after receipt of a predetermined number of impulses from said pulse generation means.

8. The apparatus of claim 5 wherein said second control means includes a position synchro mechanically driven by said driven member from an initial position to a position corresponding to the predetermined end position of said driven member and a reference synchro adapted to be preset to correspond to said predetermined end position of said driven member and means responsive to an electrical signal to mechanically disconnect said driven synchro from said driven member and means responsive to an electrical signal to return said driven synchro to its initial position.

9. The apparatus of claim 8 wherein said driven synchro is moved by a rotatable shaft mechanically connected to said driven member whereby movement of said driven member will rotate said shaft and said position synchro in a first direction wherein said mechanical disconnect means is an electrically operated clutch between said shaft and said driven member and wherein said synchro return means is a motor operably connected to said shaft, which, when energized, will rotate said shaft in a second direction to return said synchro to said initial position.

10. The apparatus of claim 9 which further includes a cam secured to said shaft having a cam face positioned relative to a fixed detent to stop rotation of said shaft in said second direction at the initial position of said driven synchro but which will permit continuous rotation of said shaft in said first direction of rotation.

References Cited
UNITED STATES PATENTS 2,866,428   12/1958   Stanfield et al. _____ 226—139
3,124,290    3/1964   Lloyd _____ 226—143

ALLEN N. KNOWLES, *Primary Examiner.*